United States Patent
Vander Sluis et al.

(10) Patent No.: US 9,278,605 B2
(45) Date of Patent: Mar. 8, 2016

(54) AIR DISTRIBUTION ARRANGEMENT FOR USE WITH VEHICLE HVAC SYSTEM AND METHOD OF DISTRIBUTING AIR

(75) Inventors: Daniel Vander Sluis, Rochester Hills, MI (US); Anthony D'Alessandro, Ray Township, MI (US); Kyle Paulsen, Royal Oak, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 772 days.

(21) Appl. No.: 13/428,280

(22) Filed: Mar. 23, 2012

(65) Prior Publication Data

US 2013/0252530 A1  Sep. 26, 2013

(51) Int. Cl.
*B60H 1/34*     (2006.01)
*B60H 1/00*     (2006.01)

(52) U.S. Cl.
CPC .......... *B60H 1/0055* (2013.01); *B60H 1/00564* (2013.01); *B60H 1/3407* (2013.01)

(58) Field of Classification Search
CPC . B60H 1/0055; B60H 1/00564; B60H 1/3407
USPC .................. 454/126, 127, 143, 152, 162, 163
See application file for complete search history.

(56) References Cited

U.S. PATENT DOCUMENTS

| | | | | |
|---|---|---|---|---|
| 4,559,868 A * | 12/1985 | Nonaka et al. | ................ | 454/127 |
| 5,620,366 A * | 4/1997 | Munzel et al. | ................ | 454/152 |
| 6,709,327 B2 * | 3/2004 | Elliot et al. | .................... | 454/121 |
| 6,843,716 B2 | 1/2005 | Butera et al. | | |
| 6,918,262 B2 * | 7/2005 | Kamiya et al. | .................. | 62/244 |
| 7,029,390 B2 * | 4/2006 | Karadia | ......................... | 454/155 |
| 7,195,555 B2 | 3/2007 | Gehring et al. | | |
| 7,409,985 B2 | 8/2008 | Biasiotto et al. | | |
| 7,815,498 B2 | 10/2010 | Biasiotto et al. | | |
| 2001/0021636 A1 * | 9/2001 | Paumier et al. | ................ | 454/152 |
| 2003/0220065 A1 * | 11/2003 | Kamiya et al. | ................ | 454/152 |
| 2003/0222436 A1 * | 12/2003 | Charbonnel | ............... | 280/728.2 |
| 2008/0146139 A1 | 6/2008 | Terai et al. | | |
| 2009/0093206 A1 * | 4/2009 | Okita et al. | .................... | 454/143 |
| 2012/0009860 A1 * | 1/2012 | Wihinen | ...................... | 454/152 |

FOREIGN PATENT DOCUMENTS

JP      20050059807 A     3/2005

* cited by examiner

*Primary Examiner* — Gregory Huson
*Assistant Examiner* — Dana Tighe
(74) *Attorney, Agent, or Firm* — Ingrassia Fisher & Lorenz PC

(57) ABSTRACT

An air distribution arrangement for distributing a flow of air produced by an HVAC system of a vehicle includes, but is not limited to, a body having an upper surface and a lower surface. The body is configured for attachment to the vehicle downstream of the flow of air. The arrangement further includes a channel associated with the upper surface disposed to receive a first portion of the flow of air and configured to guide the first portion along a length of the upper surface. The arrangement further includes a duct associated with the lower surface and extending along a path corresponding with the length. The duct is disposed to receive a second portion of the flow of air and configured to guide the second portion along the path. The duct is in fluid communication with the channel at a plurality of locations along the path.

15 Claims, 6 Drawing Sheets

AIR DISTRIBUTION ARRANGEMENT FOR USE WITH VEHICLE HVAC SYSTEM AND METHOD OF DISTRIBUTING AIR

TECHNICAL FIELD

The technical field generally relates to vehicles, and more particularly relates to an air distribution arrangement for distributing a flow of air produced by an HVAC system of a vehicle and a method of distributing a flow of air produced by an HVAC system of a vehicle.

BACKGROUND

A conventional heating, ventilation, and air conditioning system (HVAC systems) for a vehicle utilizes one or more ducts mounted under the vehicle's instrument panel to receive a stream of air from the HVAC system's blower motor and to deliver the stream of air to various locations throughout the cabin of the vehicle to cool and/or warm a vehicle occupant. A register is typically located at the terminus of the duct. The register commonly includes pivotable louvers that permit an occupant to selectively direct the stream of air as desired.

While the above described conventional arrangement for delivering the stream of air from the blower motor to the cabin of the vehicle is adequate, there is room for improvement. For example, the ducts add weight to the vehicle and consume space below the dash board. That space must be shared with other vehicle components such as cross-car beams, air bags, and wiring harnesses, to name just a few. Because these components compete for a limited amount of space, the ducts may need to take on a convoluted path, adding material costs, weight, and complication to the molding process. Additionally, the registers add complication by requiring a relatively high number of moving parts. If the ducts and registers could be eliminated from the HVAC system, it would greatly diminish the weight, cost, and complication of the HVAC system.

An earlier attempt to eliminate the ducts as a means for delivering a flow of air to the vehicle occupant was taught by Biasiotto et al. in U.S. Pat. No. 7,815,498 (hereinafter, "Biasiotto"). Biasiotto teaches an HVAC system wherein a flow of air is routed to a forward portion of a vehicle's dash board and then exhausted into the vehicle's cabin. At the exhaust outlet, the flow of air encounters both the vehicle's wind shield and the vehicle's dashboard. A scientific principle that is well known in the HVAC art is the Coanda effect. The Coanda effect is the tendency of a fluid jet to be attracted to a nearby surface. As a result of the Coanda effect, a portion of Biasiotto's airflow will adhere to, and travel along, the windshield while another portion of the air flow will adhere to, and travel along, the dashboard. In this manner, Biasiotto provides a cascading flow of air that rolls over the upper surface of the dash board and then pours onto the vehicle's occupant.

However, Biasiotto provides no guidance for the cascading flow of air as it rolls from the forward edge of the dashboard rearward to the passenger. Consequently, the flow of air may diffuse laterally as it rolls along the upper surface of the dashboard and, as a result, the cooling or heating effect of the flowing air may be greatly diminished. Additionally, Biasiotto relies exclusively on the Coanda effect as a means by which to keep the cascading flow of air entrained to the upper surface of the dashboard. However, as the cascading flow of air travels from the front of the dashboard to the rear of the dashboard, its rate of flow will decrease and the strength of the Coanda effect will correspondingly diminish, allowing an increasing amount of the flowing air to stagnate and diffuse into the ambient air of the vehicle's cabin. This will diminish the ability of the flowing air to heat and/or cool the vehicle occupant.

Accordingly, it is desirable to provide an air distribution arrangement for use with a vehicle HVAC system that eliminates the need for ducts to deliver a stream of air to the vehicle occupants. In addition, it is desirable to configure such an air distribution arrangement so as to address the limitations of the system taught by Biasotto. Furthermore, other desirable features and characteristics will become apparent from the subsequent detailed description and the appended claims, taken in conjunction with the accompanying drawings and the foregoing technical field and background.

SUMMARY

An air distribution arrangement for distributing a flow of air produced by an HVAC system of a vehicle and a method of distributing a flow of air produced by an HVAC system of a vehicle are disclosed herein.

In a first non-limiting embodiment, the air distribution arrangement includes, but is not limited to, a body having an upper surface and a lower surface. The body is configured for attachment to the vehicle downstream of the flow of air. The air distribution arrangement further includes, but is not limited to, a channel associated with the upper surface. The channel is disposed to receive a first portion of the flow of air and is configured to guide the first portion along a length of the upper surface. The air distribution arrangement still further includes, but is not limited to, a duct that is associated with the lower surface and that extends along a path corresponding with the length. The duct is disposed to receive a second portion of the flow of air and is configured to guide the second portion along the path. The duct is in fluid communication with the channel at a plurality of locations along the path.

In another non-limiting embodiment, the method includes, but is not limited to guiding a first portion of the flow of air with a channel along a length of an upper surface of an instrument panel of the vehicle. The method further includes, but is not limited to, guiding a second portion of the flow of air with a duct along a path below the upper surface of the instrument panel. The path corresponds with the length and the duct is in fluid communication with the channel at a plurality of locations along the path. The method still further includes, but is not limited to, entraining the first portion of the flow of air in the channel with the second portion of the flow of air flowing through the duct.

DESCRIPTION OF THE DRAWINGS

One or more embodiments will hereinafter be described in conjunction with the following drawing figures, wherein like numerals denote like elements.

DETAILED DESCRIPTION

Figure 1:
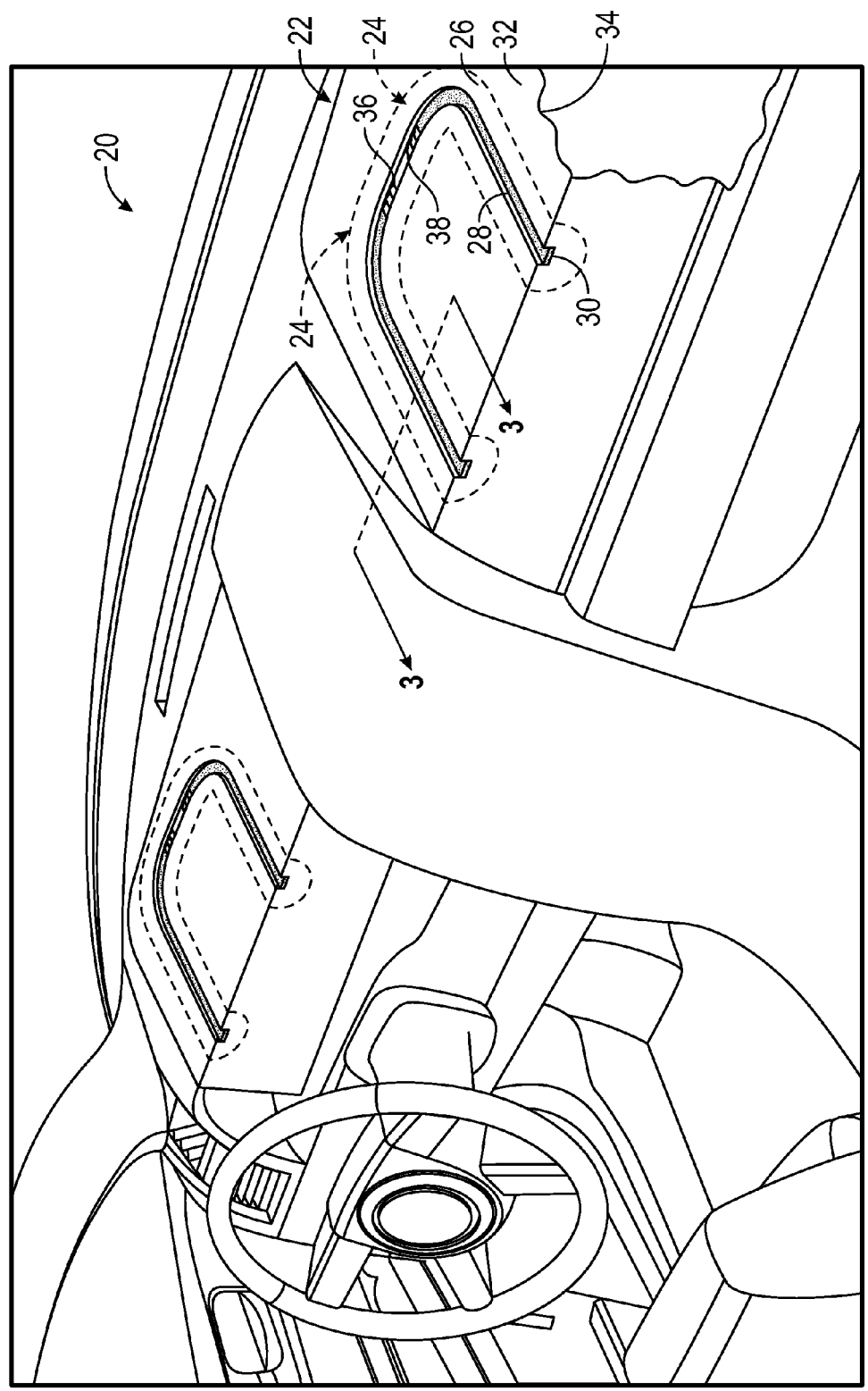
FIG. 1 is a schematic perspective view of an interior of a vehicle illustrating an instrument panel configured with an air distribution arrangement made in accordance with the teachings of the present disclosure, the air distribution arrangement including a channel and a duct.

The following detailed description is merely exemplary in nature and is not intended to limit application and uses. Furthermore, there is no intention to be bound by any expressed or implied theory presented in the preceding technical field, background, brief summary or the following detailed description.

In an exemplary embodiment, the air distribution arrangement of the present disclosure includes a channel that is integrated into, or otherwise associated with, an upper surface of the vehicle's instrument panel (or any other interior component that is mounted within the vehicle's cabin). In an example, the channel extends along an upper surface of the instrument panel from a forward edge, where the flow of air generated by the HVAC system's blower motor is exhausted into the passenger cabin, to a rearward edge, proximate a cabin occupant.

A forward end of the channel is in fluid communication with an exhaust outlet of the HVAC system's blower motor so as to receive a first portion of the flow of air as it is exhausted into the vehicle's cabin. The channel is contoured to contain the first portion of the flow of air and is configured to deliver the first portion of the flow of air to a rearward end of the channel proximate a cabin occupant. In other words, the channel directs the flowing flow of air in a manner similar to the way in which an aqueduct carries and guides water. Additionally, the Coanda effect also serves to keep the first portion of the flow of air entrained to a floor surface of the channel and to inhibit the first portion of the flow of air from flowing laterally out of the channel.

Upon reaching the rearward end of the channel, the first portion of the flow of air flows onto the cabin occupant. In some embodiments, a ramp or other flow disrupting member may be positioned near the rearward end of the channel to direct the first portion of the flow of air onto the cabin occupant. In this manner, the channel comprises an improvement over Biasotto in that the lateral walls of the channel serve to contain the first portion of the flow of air as it moves from fore to aft and therefore inhibits lateral diffusion of the first portion of the flow of air.

The air distribution arrangement further includes a duct that is attached to, and that extends along, an underside of the instrument panel. The duct is contoured and configured to follow substantially the same path taken by the channel such that the duct remains positioned below the channel along substantially the entirely length of the channel. A front end of the duct is in fluid communication with the HVAC system's blower motor so as to receive a second portion of the flow of air as it travels towards the exhaust outlet. The duct guides the second portion of the flow of air towards a rear end of the duct that is disposed proximate the rear edge of the instrument panel.

As compared with a conventional HVAC duct that is incorporated into conventional HVAC systems, the duct of the present disclosure has a relatively small cross section and is configured to carry a relatively small volume of air. This is because the primary goal of the duct is not to heat or cool the cabin, but rather to use the second portion of the flow of air to entrain the first portion of flow of air to the channel. This goal is achieved by creating a fluid communication between the duct and the channel along the length of the channel. In an embodiment, a series of holes may be defined through the floor of the channel that puts the channel and the duct in fluid communication. In some embodiments, the series of holes may be arranged along substantially the entire length of the channel. The relatively small cross sectional area of the duct will cause the second portion of the flow of air flowing through the duct to move at a higher rate of speed than the rate at which the first portion of the flow of air will flow through the channel. The greater speed of the second portion of the flow of air will cause it to have a lower static pressure that will, in turn, create a vacuum effect across the series of holes. The vacuum effect will serve to suck the first portion of the flow of air in a downward direction, thereby helping to keep the first portion of the flow of air entrained to the floor surface of the channel.

Accordingly, the present disclosure provides the advantage of eliminating the heavy, volume consuming, and convoluted duct work that is conventionally mounted below the instrument panel. It further provides the advantage of eliminating the registers that are conventionally mounted at the terminus of such duct work and thus further simplifies and reduces the weight of the vehicle's HVAC system.

An additional advantage of the arrangement disclosed herein is that the channel may be integral with the trim component used to carry the stream of flowing air. This reduces the total part count and the labor required to fabricate the present air distribution arrangement as compared with conventional air distribution arrangements for conventional HVAC systems.

Another advantage of the arrangement disclosed herein is that the trim component embodying the channel may be the instrument panel. This eliminates the need to provide additional components over and above those that are already being assembled to the vehicle and provides an opportunity to creatively enhance the visual appearance of a prominently displayed component of the vehicle's interior.

Another advantage of the arrangement disclosed herein is that the fluid communication provided between the duct and the floor of the channel may comprise a plurality of holes. This allows a designer to vary the pattern of the fluid communication along the length of the channel in manner that is optimal for keeping the first portion of the flow of air entrained to the floor of the channel.

Another advantage of the arrangement disclosed herein is that the plurality of holes may extend along an entire length of the channel. This may maximize entrainment of the first portion of the flow of air to the floor of the channel.

Another advantage of the arrangement disclosed herein is that the duct may comprise a channel having a U-shaped cross section in a lateral direction and wherein the duct may be closed off by a lower surface of the instrument panel or other body to which the duct is attached. This reduces the weight and the material cost associated with the duct.

Another advantage of the arrangement disclosed herein is the use of a disrupting body to direct the first portion of the flow of air out of the channel. This provides the benefit of guiding the first portion of the flow of air onto a vehicle occupant more directly than might otherwise occur in the absence of such a disrupting body.

Another advantage of the arrangement disclosed herein is that the disrupting body may be a ramp. Ramps have a simple construction that will help to maintain the overall simplicity of the air distribution arrangement.

Another advantage of the arrangement disclosed herein is that the disrupting body may be disposed near an end of the channel. This ensures greater proximity to a cabin occupant when the first portion of the flow of air is directed out of the channel.

Another advantage of the arrangement disclosed herein is that the disrupting body may be configured for selective adjustment. This provides a cabin occupant with control over the direction taken by the first portion of the flow of air as it flows out of the channel.

Another advantage of the arrangement disclosed herein is that the instrument panel or other body embodying or supporting the channel may include a duct opening to permit venting of the second portion of the flow of air from the duct into the cabin. This helps to increase the effectiveness of the air distribution arrangement at heating and/or cooling cabin occupants.

Another advantage of the arrangement disclosed herein is that a cover member may be provided proximate the duct opening and may be configured to permit selective opening and closing of the duct opening. In this manner, the cabin occupant is given greater control over the effectiveness of the air distribution arrangement.

Another advantage of the arrangement disclosed herein is that the arrangement may further include a facade member positioned over the instrument panel or other body to at least partially conceal the channel and to focus the flow of air, directing it towards an occupant. This allows for a decorative surface to be positioned over the channel to enhance the air distribution arrangement's aesthetic appearance as well as to increase the effectiveness of the channel's ability to distribute the flow of air to an occupant.

Another advantage of the arrangement disclosed herein is that the facade member may include a register opening that corresponds with an end of the channel. This allows for the first portion of the flow of air to flow out of the channel in an unobstructed manner, thus providing enhanced focus of the flow of air.

A greater understanding of the air distribution arrangement and the method of distributing a flow of air described above may be obtained through an examination of the illustrations accompanying this application together with a review of the detailed description that follows.

FIG. 1 is a perspective view of an interior portion of a vehicle 20 having an HVAC system including a blower motor (not shown) that is configured to generate a flow of air for heating and cooling the cabin occupants of vehicle 20. The vehicle 20 further includes an instrument panel assembly 22 that includes an air distribution arrangement 24 for distributing the flow of air to the cabin occupants.

Air distribution arrangement 24 includes a body 26, a channel 28 associated with body 26, and a duct 30 suspended below body 26. In the illustrated embodiment, body 26 comprises an upper panel of instrument panel assembly 22. It should be understood that, in other embodiments, body 26 may comprise any surface or other trim component inside the passenger cabin of vehicle 20. Body 26 has an upper surface 32 and a lower surface 34. In the illustrated embodiment, channel 28 is integral with body 26 (e.g., formed into or defined by body 26) and duct 30 is suspended from lower surface 34. It should be understood that in other embodiments, duct 30 may be incorporated into body 26 and channel 28 may comprise a separate and distinct component that is incorporated into, attached to, or otherwise supported on upper surface 32. In still other embodiments, channel 28 and duct 30 may each comprise separate and distinct components that are incorporated into, attached to, or otherwise supported on upper surface 32 and lower surface 34, respectively.

In the illustrated embodiment, exhaust outlets 36 and 38 are positioned near a forward end of instrument panel assembly 22 and are configured to direct the flow of air produced by the HVAC system's blower motor into channel 28. Channel 28 includes a floor surface and two oppositely disposed lateral walls that give channel 29 a U-shaped cross section. The inner portion of channel 28 is substantially free of structure along substantially the entire length. Accordingly, channel 28 is configured to receive the two oppositely flowing streams of air and to guide them towards the rearward end of instrument panel assembly 22 towards a cabin occupant. As a result of the Coanda effect, the movement of the flow of air through channel 28 causes the flow of air to become entrained to the floor of channel 28.

In the illustrated embodiment, two exhaust outlets (exhaust outlet 36 and exhaust outlet 38) are utilized to direct two oppositely flowing streams of air in opposite directions through channel 28. It should be understood that air distribution arrangement 24 is not limited to use with two oppositely oriented exhaust outlets, but rather, in other embodiments, other suitable configuration may be employed. For example, a single exhaust outlet may be utilized to direct a single flow of air into a channel and the channel may include a splitter that divides the flow of air into two or more streams of air.

Duct 30 is attached to lower surface 34 and extends along a path that corresponds to the path of channel 28. Duct 30 receives a portion of the flow of air produced by the HVAC system's blower motor and is configured to guide that portion of the flow of air along a path that substantially corresponds with the path followed up by the flow of air flowing through channel 28. Duct 30 exhausts at a rearward edge of instrument panel assembly 22 into the passenger cabin.

A plurality of holes (best seen in FIG. 3) extend between channel 28 and duct 30, thereby placing channel 28 and duct 30 in fluid communication. In the illustrated embodiment, this fluid communication continues along substantially an entire length of channel 28 and duct 30. Because of this fluid communication, and also because of the high rate of speed with which air flows through duct 30, as the air flows through duct 30, it will create a negative pressure with respect to channel 28 that causes the flow of air flowing through channel 28 to be pushed in a downward direction towards the floor surface of channel 28 and to thereby remain more securely entrained within channel 28.

Figure 2:
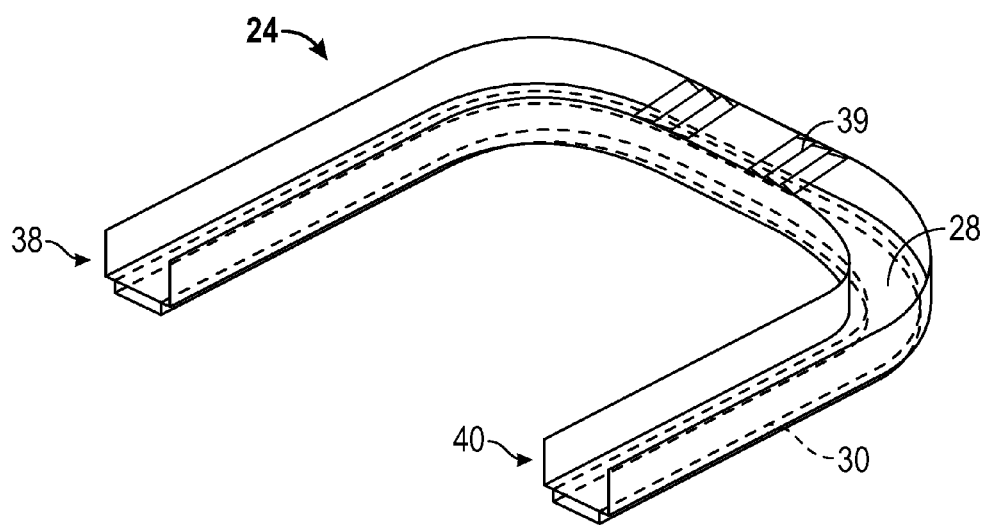
FIG. 2 is a perspective view of a portion of the instrument panel of FIG. 1 illustrating the channel and the duct, the channel being illustrated in solid lines and the duct being illustrated in phantom lines.

FIG. 2 is a perspective view illustrating air distribution arrangement 24. Channel 28 is illustrated in solid lines while duct 30 is illustrated in phantom lines. Also illustrated in FIG. 2 is conduit 39 which delivers the flow of air from the HVAC system's blower motor to both channel 28 and duct 30. As illustrated in FIG. 2, channel 28 and duct 30 follow substantially corresponding paths between conduit 39, at a forward end, and terminus 38 and terminus 40, at a rearward end.

Figure 3:
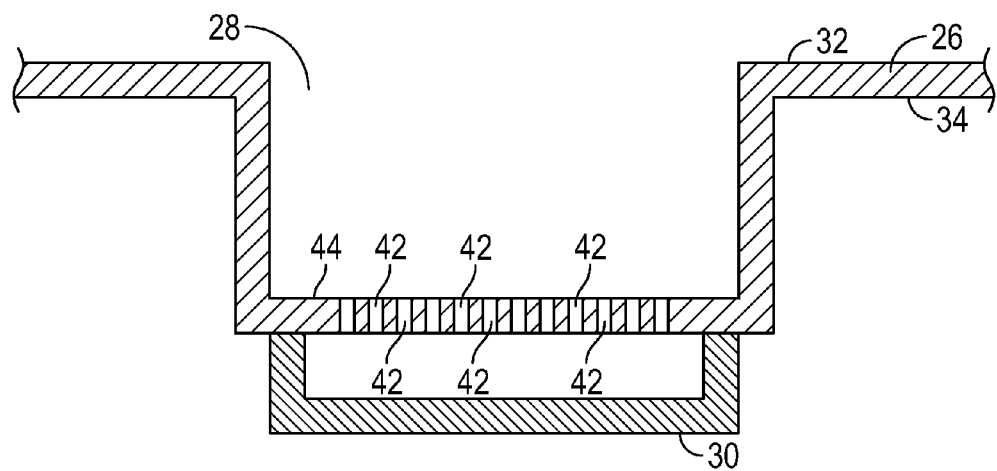
FIG. 3 is a cross section along the line 3-3 of FIG. 1.

FIG. 3 is a cross-sectional view taken along line 3-3 of FIG. 1. In FIG. 3, the U-shaped cross section of channel 28 is visible. Duct 30 also has a U-shaped cross-section and is closed off at an upper end by lower surface 34 of body 26. In the illustrated embodiment, a relatively large disparity between the cross-sectional area of duct 30 and channel 28 has been depicted. In other embodiments, a larger or smaller disparity between the cross-sectional areas of these two components may be employed without departing from the teachings of the present disclosure.

Also depicted in FIG. 3 is the fluid communication between channel 28 and duct 30. As illustrated, a plurality of holes 42 extend through a floor surface 44 of channel 28 to provide fluid communication between an interior volume of duct 30 and an interior volume of channel 28.

Figure 4:
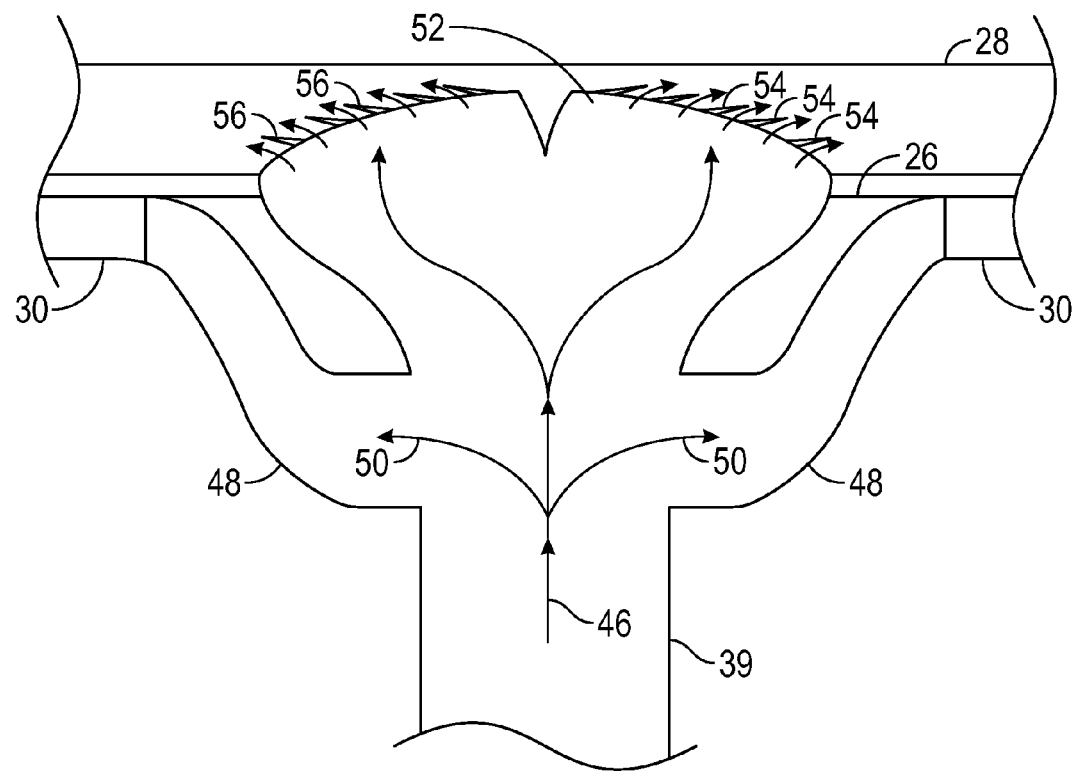
FIG. 4 is a schematic view illustrating an air guidance structure for dividing a flow of air produced by a vehicle HVAC system between the channel and the duct of FIG. 1.

FIG. 4 illustrates a cross-sectional view of conduit 39 which is configured to deliver a flow of air 46 to duct 30 and to channel 28. As flow of air 46 travels in an upward direction through conduit 39, it encounters passageways 48 through which a portion 50 of flow of air 46 enters. Upon entering passageway 48, portion 50 of flow of air 46 is directed into duct 30. As flow of air 46 continues in an upward direction past passageway 48, it encounters a splitter section 52 which divides flow of air 46 into two portions which are vented in opposite directions through louvers 54 and 56 into channel 28.

Figure 5:
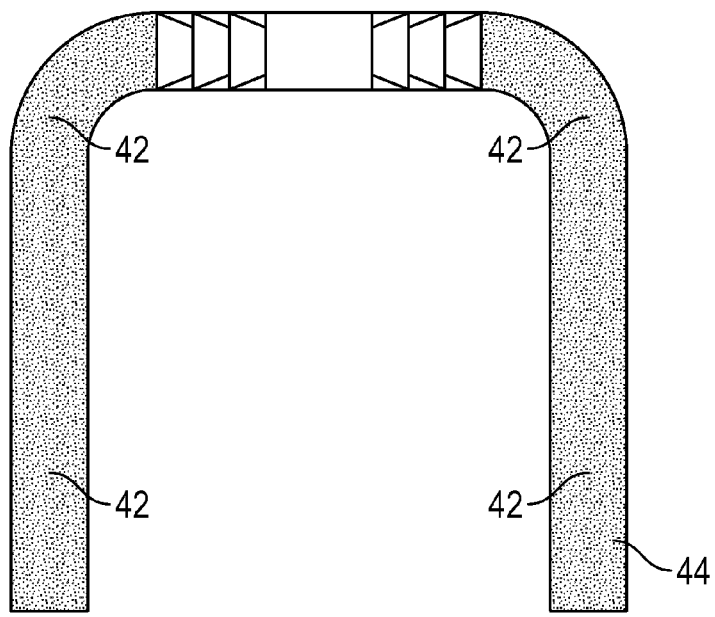
FIG. 5 is a schematic plan view of a portion of the instrument panel of FIG. 1 illustrating a plurality of holes disposed along a floor surface of the channel of FIG. 1 to provide fluid communication between the channel and the duct of FIG. 1.

FIG. 5 is a schematic plan view of air distribution arrangement 24. In this view, plurality of holes 42 can be seen arranged across substantially the entire floor surface 44. Plurality of holes 42 may be defined through floor surface 44 in any suitable pattern and, in some embodiments, may be arranged to generate an optimal or desired amount of suction.

Figure 6:
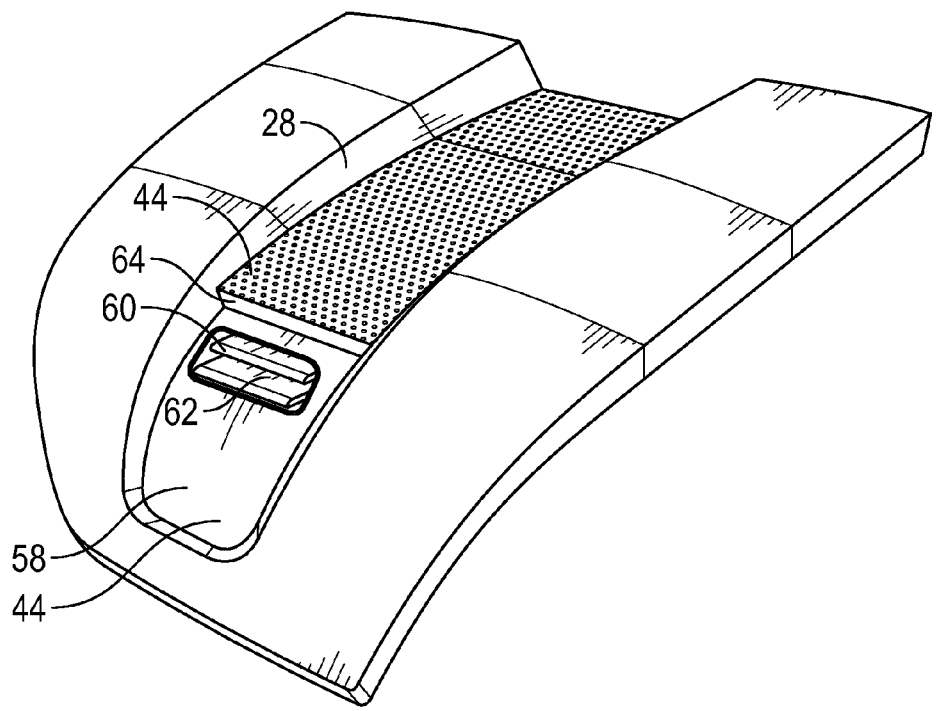
FIG. 6 is a perspective view of an end of the channel of FIG. 1.

FIG. 6 is a perspective view illustrating an end portion 58 of channel 28. In the illustrated embodiment, a duct opening 60 is defined in floor surface 44. An end of duct 30 (not shown) is coupled with duct opening 60 to provide duct 30 with an exhaust port. A closing member 62 (illustrated as louvers in FIG. 6) is associated with duct opening 60 and is configured to selectively close duct opening 60. In some embodiments, when closing member 62 is in a closed position, the flow of air flowing through duct 30 may be redirected. For example, the flow of air flowing through duct 30 may be directed to vent into a foot well of vehicle 20 when closing member 62 is closed. In other embodiments, when closing member 62 is closed, the flow of air through duct 30 ceases and the flow of air flowing through channel 28 will then rely entirely on the Coanda effect to remain entrained within channel 28 as it travels rearward toward a cabin occupant.

Also illustrated in FIG. 6 is a ramp member 64. Ramp member 64 is configured to provide a discontinuity in floor surface 44. The discontinuity will cause the flow of air flowing through channel 28 to separate from floor surface 44 and to flow onto a cabin occupant situated near end portion 58.

Figure 7:
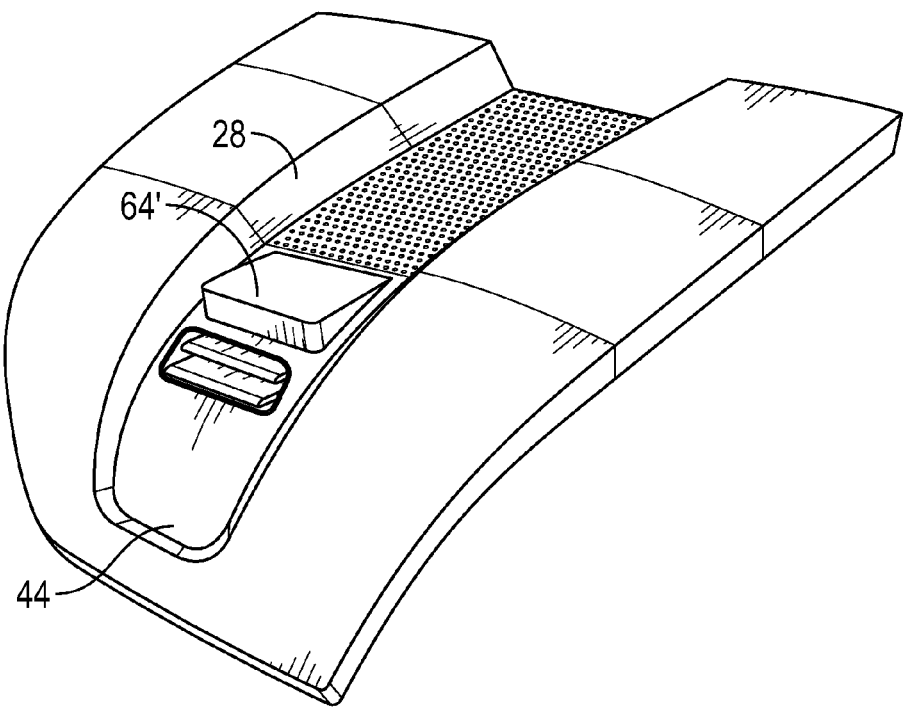
FIG. 7 is a perspective view of another embodiment of the end of the channel of FIG. 1 with a disrupting body illustrated in a deployed position.
Figure 8:
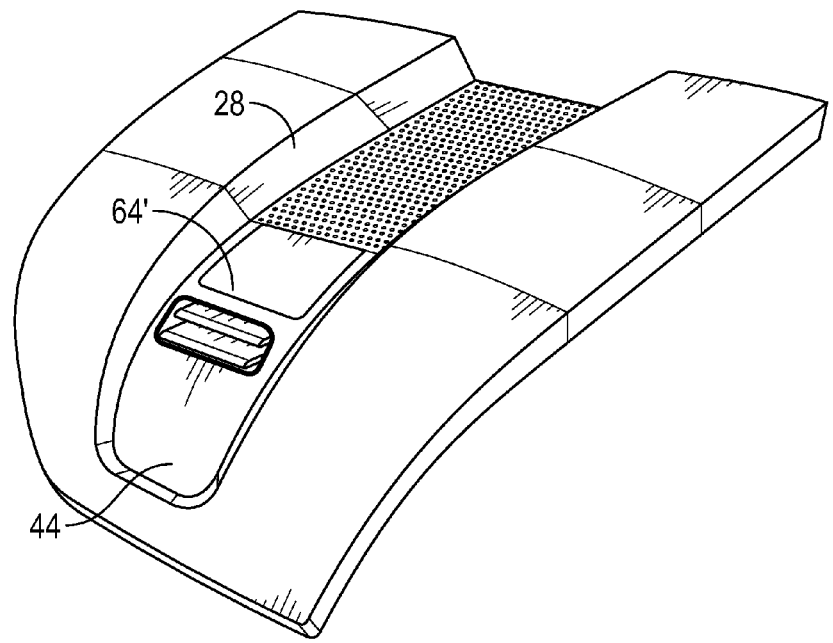
FIG. 8 is a perspective view similar to FIG. 7 with the disrupting body illustrated in a retracted position.

FIGS. 7 and 8 are perspective views similar to the view presented in FIG. 6, but which illustrate an alternate embodiment of the ramp. With continuing reference to FIG. 6, ramp member 64 was configured to remain stationary. FIGS. 7 and 8 illustrate ramp member 64' which is configured for movement. Ramp member 64' is configured to move between a deployed position (illustrated in FIG. 7) and a retracted position (illustrated in FIG. 8). While in the deployed position, the flow of air flowing through channel 28 may be directed upward and away from floor surface 44 at an angle to enhance occupant comfort. In some embodiments, the angle of ramp member 64' may be occupant selectable. While in the retracted position, the flow of air flowing through channel 28 will remain entrained within channel 28 until the flow of air reaches an end of channel 28 where it will then pour out of channel 28 in the direction dictated by the angle and contour of channel 28's terminus.

Figure 9:
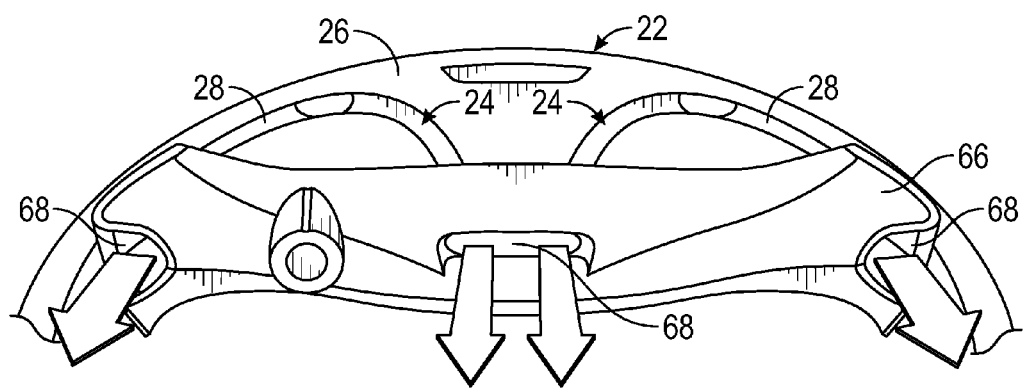
FIG. 9 is a perspective view illustrating a facade member positioned over the instrument panel of FIG. 1.

FIG. 9 is a perspective view illustrating a facade member 66. Facade member 66 may be any structure that is configured to be supported by and/or attached to body 26 and to be positioned over air distribution arrangement 24 to conceal channel 28. Facade member 66 may take any suitable form and may include register openings 68 to permit the flow of air flowing out of channel 28 to reach a cabin occupant.

Figure 10:
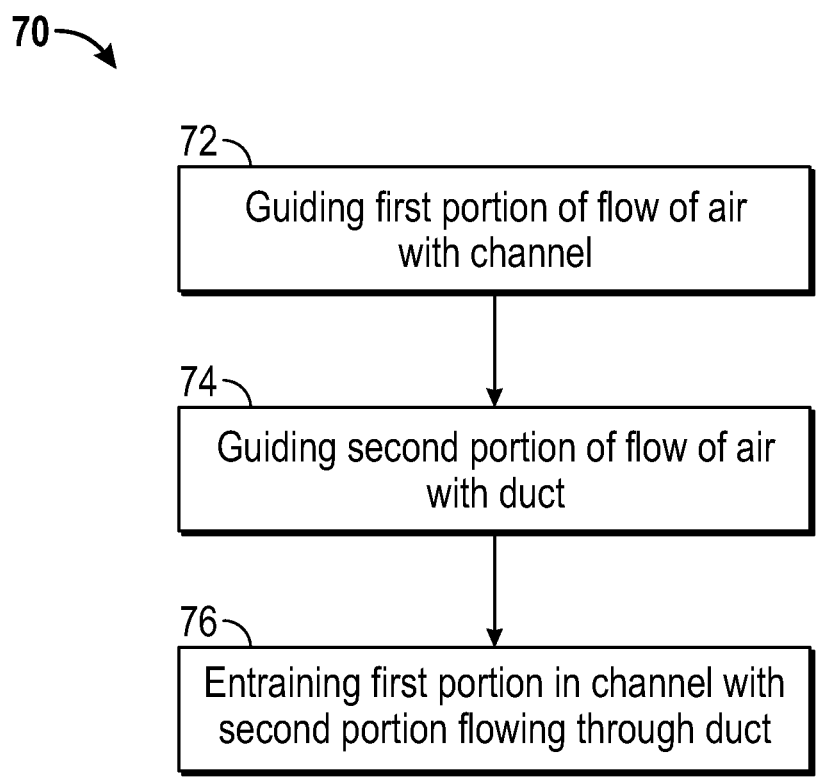
FIG. 10 is a block diagram illustrating an embodiment of a method of distributing a flow of air produced by an HVAC system of a vehicle.

FIG. 10 is a block diagram illustrating an embodiment of a method 70 of distributing a flow of air produced by an HVAC system of a vehicle. With continuing reference to FIGS. 1-9, method 70 may be employed in conjunction with air distribution arrangement 24 or with other air distribution arrangements utilizing a channel and a duct in fluid communication with one another.

At block 72, a first portion of the flow of air is received and guided by a channel that is associated with an instrument panel, a trim component, or any other suitable body within a cabin. In some embodiments, the channel may be integrated with the body while in other embodiments, the channel may be supported by and/or attached to the body. The channel is configured to guide the first portion of the flow of air from an exhaust vent fed by the HVAC system's blower motor along the path that leads to a position within the cabin of the vehicle situated near a cabin occupant.

At block 74, a second portion of the flow of air is received and guided by a duct that extends along a path corresponding with the path followed by the channel. The duct and the channel are in fluid communication with one another as a result of a plurality of holes or passages extending between the duct and the channel.

At block 76, the first portion of the flow of air is entrained within the channel as a result of the second portion of the flow of air flowing through the duct. The duct is configured to cause the second portion of the flow of air to flow at a rate that is higher than the flow rate of the first portion of the flow of air through the channel. This disparity in flow rate causes a negative pressure that sucks the first portion of the flow of air in a downward direction towards the duct, thereby in training the first portion of the flow of air within the channel.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An air distribution arrangement for distributing a flow of air produced by an HVAC system of a vehicle, the air distribution arrangement comprising:
   a body having an upper surface and a lower surface, the body configured for attachment to the vehicle downstream of the flow of air;
   a channel defined in the upper surface, the channel disposed to receive a first portion of the flow of air and configured to guide the first portion along a length of the upper surface, the channel having a generally U-shaped configuration in cross section along substantially an entire length of the channel, an upper portion of the channel being open to a passenger compartment of the vehicle and free of a covering along substantially the entire length of the channel, and an inner portion of the channel being substantially free of structure along substantially the entire length of the channel; and a duct associated with the lower surface and extending along a path corresponding with the length, the duct disposed to receive a second portion of the flow of air and configured to guide the second portion along the path, the duct being in fluid communication with the channel at a plurality of locations along the path, wherein the channel and the duct are aligned with one another such that the channel and the duct direct the first portion and the second portion, respectively, in substantially the same direction along the body.

2. The air distribution arrangement of claim 1, wherein the channel is integral with the body.

3. The air distribution arrangement of claim 1, wherein the body comprises an upper surface of a vehicle instrument panel.

4. The air distribution arrangement of claim 1 wherein a plurality of holes are defined along the path, the plurality of holes providing fluid communication between the channel and the duct.

5. The air distribution arrangement of claim 4, wherein the plurality of holes are arranged along substantially an entire portion of the path.

6. The air distribution arrangement of claim 1, wherein the duct comprises a channel member having a U-shaped profile across a lateral cross section of the duct, wherein an upper end of the duct is closed off by the lower surface.

7. The air distribution arrangement of claim 1, wherein the channel includes a disrupting body configured to direct the first portion out of the channel.

8. The air distribution arrangement of claim 7, wherein the disrupting body comprises a ramp.

9. The air distribution arrangement of claim 7, wherein the disrupting body is disposed proximate an end of the length.

10. The air distribution arrangement of claim 7, wherein the disrupting body is configured for selective adjustment between a retracted position and a deployed position.

11. The air distribution arrangement of claim 1, wherein the body defines a duct opening and wherein an end of the duct is in fluid communication with the duct opening, whereby the second portion of the flow of air vents through the duct opening.

12. The air distribution arrangement of claim 11, further comprising a cover member disposed proximate the duct opening and configured to selectively close the duct opening.

13. The air distribution arrangement of claim 1, further comprising a facade member positioned above the body and configured to at least partially conceal the channel.

14. The air distribution arrangement of claim 13, wherein the facade member includes a register opening disposed to correspond with an end of the channel.

15. A method of distributing a flow of air produced by an HVAC system of a vehicle, the method comprising:

guiding a first portion of the flow of air with a channel defined in an upper surface of an instrument panel along a length of the upper surface of the instrument panel of the vehicle, the channel having a generally U-shaped configuration in cross section along substantially an entire length of the channel, an upper portion of the channel being open to a passenger compartment of the vehicle and free of a covering along substantially the entire length of the channel, and an inner portion of the channel being substantially free of structure along substantially the entire length of the channel;

guiding a second portion of the flow of air with a duct along a path below the upper surface of the instrument panel, the path corresponding with the length, and the duct being in fluid communication with the channel at a plurality of locations along the path;

entraining the first portion of the flow of air in the channel with the second portion of the flow of air flowing through the duct.

* * * * *